United States Patent
Fischer et al.

(10) Patent No.: US 12,418,168 B2
(45) Date of Patent: Sep. 16, 2025

(54) HIGH-IMPEDANCE DIFFERENTIAL PROTECTION USING A DIVERSITY OF SIGNALS

(71) Applicant: Schweitzer Engineering Laboratories, Inc., Pullman, WA (US)

(72) Inventors: Normann Fischer, Colfax, WA (US); Anushka M. Dissanayake, Pullman, WA (US); Jay Hartshorn, Pullman, WA (US); Marcos A. Donolo, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 142 days.

(21) Appl. No.: 18/419,092

(22) Filed: Jan. 22, 2024

(65) Prior Publication Data

US 2024/0250518 A1    Jul. 25, 2024

Related U.S. Application Data (60) Provisional application No. 63/481,501, filed on Jan. 25, 2023.

(51) Int. Cl.
*H02H 7/045* (2006.01)
*H02H 1/00* (2006.01)
*H02H 7/04* (2006.01)

(52) U.S. Cl.
CPC .......... *H02H 7/045* (2013.01); *H02H 1/0007* (2013.01); *H02H 7/042* (2013.01)

(58) Field of Classification Search
CPC ...... H02H 7/045; H02H 1/0007; H02H 7/042; H02H 7/22; H02H 3/283
See application file for complete search history.

(56) References Cited

U.S. PATENT DOCUMENTS

| | | | |
|---|---|---|---|
| 4,387,336 A | 6/1983 | Joy |
| 4,829,298 A | 5/1989 | Fernandes |
| 5,006,846 A | 4/1991 | Granville |
| 5,224,011 A | 6/1993 | Yalla |
| 5,341,265 A | 8/1994 | Westrom |
| 5,446,682 A | 8/1995 | Janke |

(Continued)

OTHER PUBLICATIONS

John Needs and Zafer Korkmaz "Using the SEL-751 and SEL-751A for High-Impedance Differential Protection" SEL Application Guide, vol. IV, Mar. 2017.

(Continued)

*Primary Examiner* — Daniel Cavallari
(74) *Attorney, Agent, or Firm* — Jared L. Cherry (57) ABSTRACT

A system for high-impedance differential protection for power systems using a variety of signals from the power system. A fault may be detected using filtered phase current or filtered phase voltage magnitudes from current transformers (CTs) connected in parallel by phase. A fault may be detected using filtered phase voltages and raw phase voltages from the CTs. A fault may be detected using raw phase currents and raw phase voltages from the CTs. A fault may be detected using filtered phase currents and raw phase currents. A fault may be detected using raw phase currents and raw neutral currents. The embodiments herein maintain dependability and security of a differential element even when low-class CTs are used. The embodiments herein may allow users to optimize pickup settings even when low-class CTs are used.

20 Claims, 9 Drawing Sheets

(56) References Cited

U.S. PATENT DOCUMENTS

| | | |
|---|---|---|
| 5,498,956 A | 3/1996 | Kinney |
| 5,592,393 A | 1/1997 | Yalla |
| 5,694,281 A | 12/1997 | Roberts |
| 5,703,745 A | 12/1997 | Roberts |
| 5,731,943 A | 3/1998 | Roberts |
| 5,793,750 A | 8/1998 | Schweitzer |
| 5,963,404 A | 10/1999 | Guzman |
| 6,028,754 A | 2/2000 | Guzman |
| 6,236,949 B1 | 5/2001 | Hart |
| 6,256,592 B1 | 7/2001 | Roberts |
| 6,265,881 B1 | 7/2001 | Meliopoulos |
| 6,341,055 B1 | 1/2002 | Guzman |
| 6,356,421 B1 | 3/2002 | Guzman |
| 6,411,865 B1 | 6/2002 | Qin |
| 6,442,010 B1 | 8/2002 | Kasztenny |
| 6,446,682 B1 | 9/2002 | Viken |
| 6,518,767 B1 | 2/2003 | Roberts |
| 6,525,543 B1 | 2/2003 | Roberts |
| 6,590,397 B2 | 7/2003 | Roberts |
| 6,603,298 B2 | 8/2003 | Guzman |
| 6,608,742 B2 | 8/2003 | Schweitzer |
| 6,662,124 B2 | 12/2003 | Schweitzer |
| 6,757,146 B2 | 6/2004 | Benmouyal |
| 6,839,210 B2 | 1/2005 | Roberts |
| 6,845,333 B2 | 1/2005 | Anderson |
| 6,946,753 B2 | 9/2005 | Kernahan |
| 7,002,784 B2 | 2/2006 | Wang |
| 7,196,884 B2 | 3/2007 | Guzman |
| 7,209,839 B2 | 4/2007 | Roytelman |
| 7,319,576 B2 | 1/2008 | Thompson |
| 7,425,778 B2 | 9/2008 | Labuschagne |
| 7,480,580 B2 | 1/2009 | Zweigle |
| 7,570,469 B2 | 8/2009 | Guzman |
| 7,582,986 B2 | 9/2009 | Folkers |
| 7,630,863 B2 | 12/2009 | Zweigle |
| 7,660,088 B2 | 2/2010 | Benmouyal |
| 7,710,693 B2 | 5/2010 | Guzman |
| 7,856,327 B2 | 12/2010 | Schweitzer |
| 8,405,944 B2 | 3/2013 | Donolo |
| 11,469,588 B2 | 10/2022 | Donolo |
| 2004/0027748 A1 | 2/2004 | Kojovic |
| 2004/0059469 A1 | 3/2004 | Hart |
| 2006/0224336 A1 | 10/2006 | Petras |
| 2007/0086134 A1 | 4/2007 | Zweigle |
| 2008/0281540 A1 | 11/2008 | Zweigle |
| 2009/0085407 A1 | 4/2009 | Venkatasubramanian |
| 2009/0088989 A1 | 4/2009 | Guzman |
| 2009/0088990 A1 | 4/2009 | Schweitzer |
| 2009/0089608 A1 | 4/2009 | Guzman |
| 2009/0091867 A1 | 4/2009 | Guzman |
| 2009/0099798 A1 | 4/2009 | Gong |
| 2009/0125158 A1 | 5/2009 | Schweitzer |
| 2010/0002348 A1 | 1/2010 | Donolo |
| 2010/0114390 A1 | 5/2010 | Stevenson |
| 2023/0170685 A1 | 6/2023 | Donolo |

OTHER PUBLICATIONS

Ariana Hargrave, Michael J. Thompson, and Brad Heilman, "Beyond the Knee Point: A Practical Guide to CT Saturation" Originally presented at the 44th Annual Western Protective Relay Conference, Oct. 2017.

Stanley E. Zocholl and David Costello, "Application Guidelines for Microprocessor-Based, High-Impedance Bus Differential Relays," Originally presented at the 62nd Annual Conference for Protective Relay Engineers, Mar. 2009.

Russ Franklin, Michael J. Thompson and Hector J. Altuve "High-Impedance Differential Applications with Mismatches CTs" Originally presented at the 44th Annual Wester Protective Relay Conference, Oct. 2017.

S.E. Zocholl "Current Transformer Accuracy Ratings" Jun. 2006.

HIGH-IMPEDANCE DIFFERENTIAL PROTECTION USING A DIVERSITY OF SIGNALS

RELATED APPLICATIONS

This application claims priority to U.S. Provisional Application Ser. No. 63/481,501, filed on Jan. 25, 2023, entitled "HIGH-IMPEDANCE DIFFERENTIAL PROTECTION USING A DIVERSITY OF SIGNALS," which is hereby incorporated by reference in its entirety for all purposes.

TECHNICAL FIELD

This disclosure relates to high-impedance differential protection in an electric power system. More particularly, this disclosure relates to differential protection using a diversity of signals that is useful even when the power system is implemented with lower-class current transformers (CTs).

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Reliable and secure electric power delivery system protection is facilitated by acquisition of current signals that reliably represent current of the monitored equipment. For example, a high-impedance bus differential application typically includes a number of current transformers (CTs), each in electrical communication with a feeder of the bus, where the CT secondary (or secondaries) are connected in parallel. An intelligent electronic device (IED) may have an input for the CT secondary (or secondaries), and include hardware for safely obtaining current signals from the CT secondary (or secondaries). The secondary signals may be used for bus differential protection.

CTs are generally categorized according to class ratings. ANSI relay accuracy class defines the performance of a CT under certain conditions, with respect to the burden the secondary of the CT will support at a given voltage, as well as the maximum ratio error. All ANSI relay accuracy classes require that the ratio error not exceed 10% plus or minus. The standard ANSI relay accuracy classes are C10, C20, C50, C100, C200, C400 and C800, or T10, T20, T50, T100, T200, T400 and T800. The numerical suffix is the voltage that the CTs secondary must develop when the current in the secondary is 20 times nominal. For example, if the nominal secondary current is 5 A, the designated voltage must be developed when the secondary current is 100 A (20×5 A=100 A). The accuracy is not a complete statement without a specified burden. In this case the burden can be determined by dividing the numerical suffix by 100. For example, for C100, 100 divided by 100 equals a 1 OHM burden. In the case of an ANSI relay accuracy class of C400, the maximum ratio error shall not exceed 10% plus or minus when 20 times nominal current flows in the secondary and the secondary voltage will be 400V with a burden of 4 OHMS.

Lower-class CTs can lead to various issues, such as an increase in the minimum detectable fault current and a narrower pulse width in operating signals. Lower-class CTs develop a lower voltage for a given signal on the primary, and as such, the signal-to-noise ratio for such CTs is lower. The reduced voltage developed by lower-class CTs also increases the minimum detectable fault current is observed and results in a narrower pulse width in operating signals for current and voltage signals. While these problems may be attenuated by, for example, lowering a pickup setting (voltage or current), the lower settings may expose the high-impedance bus differential element to security issues. Another solution may be to replace the low-class CTs with higher-class CTs. However, this solution is expensive and may require significant time and disruption to the operation of the power system.

The inventors of the present disclosure have recognized the need for a system for high-impedance bus differential protection, using existing CTs, that maintains dependability and security. As used herein, the term dependability refers to implementing a protective action for internal faults, and the term security refers to not implementing a protective action for external faults. The systems and methods disclosed herein may satisfy this need and provide additional benefits that may be apparent to one of skill in the art.

The embodiments provided herein disclose a dependable and secure high-impedance bus differential element that may be used even with lower-class CTs. The embodiments may use a current signal from the parallel CTs as well as another signal (such as a neutral current signal or a voltage signal) to detect high-impedance bus differential faults. The embodiments herein may combine filtered data to provide dependable protection when using appropriate CTs, with raw samples from two different channels (a voltage channel and a current channel; or two current channels). The filtered data and raw samples may be used for dependable and secure differential fault protection.

Systems and methods disclosed herein have additional advantages, including decreasing susceptibility to single event upsets (SEUs). An SEU is a change in an electronic device (e.g., a microprocessor, memory device, etc.) caused by a transitory event. The transitory event may cause a state change in a logic element or memory location (e.g., a memory bit) as a result of the charge created by ionization in or close to a node of the device. SEUs may be caused by solar events, cosmic rays, nuclear reactions, etc. SEUs are unpredictable, and as such, SEUs may result in maloperation of associated systems.

Figure 1:
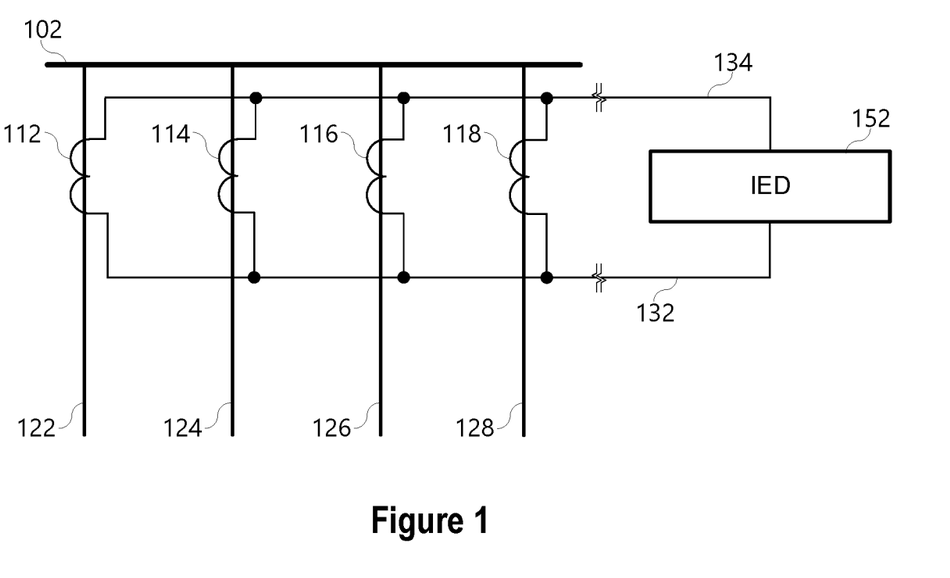
FIG. 1 illustrates a simplified one-line diagram of a portion of an electric power delivery system that includes a bus and a plurality of feeders consistent with embodiments of the present disclosure.

FIG. 1 illustrates a simplified one-line diagram of a portion of an electric power delivery system that includes a bus 102 and a plurality of feeders 122, 124, 126, 128. Each feeder 122-128 includes a CT 112, 114, 116, 118 for providing current signals to an intelligent electronic device (IED) 152. As can be seen, secondary terminal leads 132, 134 from corresponding sides of each CT 112-118 may be joined together for providing a differential current signal to the IED 152. In various other embodiments, each CT 112-118 may be separately connected to the IED, such that a relay receives separate current signals from each CT.

The IED 152 may be configured to provide bus differential protection. The IED 152 may also include hardware for safely obtaining signals from a CT secondary, or such hardware may be provided as a separate unit.

IED 152 may be configured to implement various actions in response to detection of various signals. The specific thresholds may be impacted by the class of CTs 112, 114, 116, and 118. Higher class CTs may generate signals with greater amplitude and duration for a given input. As such, the thresholds associated with higher class CTs may offer greater dependability in comparison to lower-class CTs in similar applications.

Figure 2:
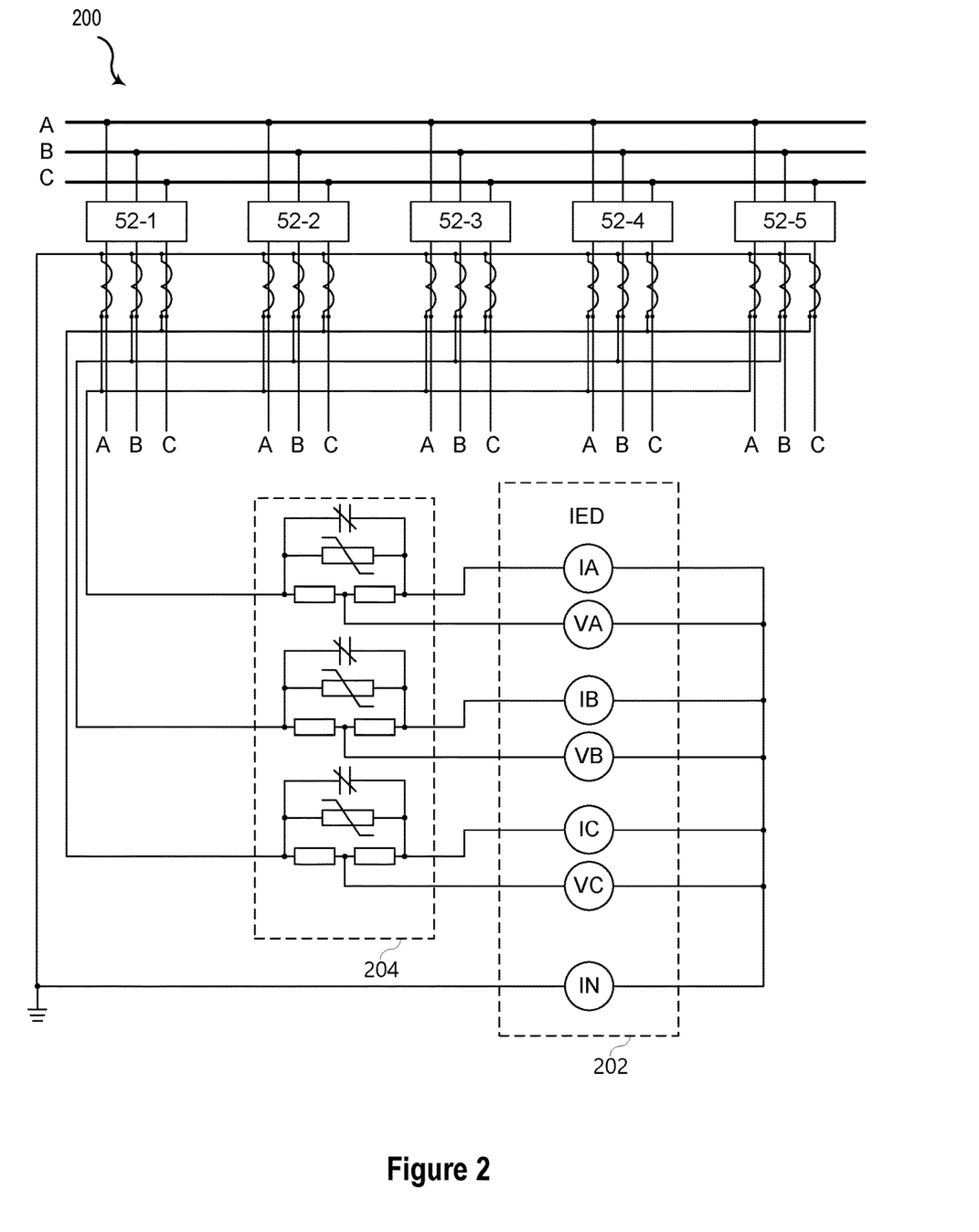
FIG. 2 illustrates a simplified phase diagram of a system for detecting differential faults consistent with embodiments of the present disclosure.

FIG. 2 illustrates a simplified phase diagram of an electric power system 200 for detecting differential faults in accordance with several embodiments herein. In particular, three electrical phase conductors A, B, and C are illustrated. The phase conductors may be a bus or other section of an electric power delivery system where differential protection is desired (such as, for example, a transformer). The three phase conductors may be electrically connected to a plurality of phase feeders, where a circuit breaker (52-1, 52-2, 52-3, 52-4, 52-5) may be used to connect and/or disconnect the feeders from the conductors.

An IED 202 may be used to obtain signals from electric power system 200. As is illustrated, various CTs connected in parallel and grouped by phase may be used. IED 202 may obtain a current channel of each phase (IA, IB, IC) from current flowing through the parallel-connected CT terminals. IED 202 may also obtain a voltage channel of each phase (VA, VB, VC) across the parallel-connected CT terminals (which may be obtained using one or more resistors). IED 202 may further obtain a neutral current channel (IN).

Various hardware may be used as either part of IED 202 or separate from IED 202 for obtaining these signals. A high-impedance module 204 may be used to obtain the signals. In one specific embodiment, high-impedance module 204 may be embodied as a SEL High-Impedance Module (SEL-HZM) available from Schweitzer Engineering Laboratories of Pullman, Washington.

Under nominal conditions, where a fault internal to the differential protection zone is not present, the current through the parallel branch CTs should be near zero, and the voltage across the terminals of the parallel branch CTs should be near zero. A fault occurring in a zone of differential protection would result in current through the parallel branch CTs, as well as a voltage signal. A system for differential protection may detect the fault using such currents and/or voltages.

In one specific embodiment, IED 202 may be embodied as a high-impedance differential relay. A high-impedance differential relay is also referred to as an ANSI 87Z protection element. In a typical application, the pickup setting for the 87Z element is the minimum voltage on the stabilizing resistor for which the relay will trip the bus, which is given by Eq. 1.

$$V_r = \frac{I_F}{CTR}(R_{CT} + 2 \cdot R_{leads}) \quad \text{Eq. 1}$$

In Eq. 1, $I_F$ is the maximum primary external fault current, CTR is the CT ratio, $R_{CT}$ is the internal CT resistance, and $R_{leads}$ is the one-way CT lead resistance from CTs to the junction point.

A preliminary pickup threshold may be computed by applying a safety factor on top of $V_T$, as shown in Eq. 2.

$$V_{87Z} = \text{Safety Factor} \cdot V_r \quad \text{Eq. 2}$$

In some embodiments, a minimum setting may be used for $V_{87Z}$. In one specific embodiment, the minimum setting may be at least 200 Volts.

IED 202 may implement various protection functions associated with electric power system 200. The protection functions may include over-voltage protection and over-current protection. In the event of an over-voltage or over-current condition, IED 202 may interrupt the flow of electrical current through an impacted portion of electric power system 200 by issuing a trip command.

Figure 3A:
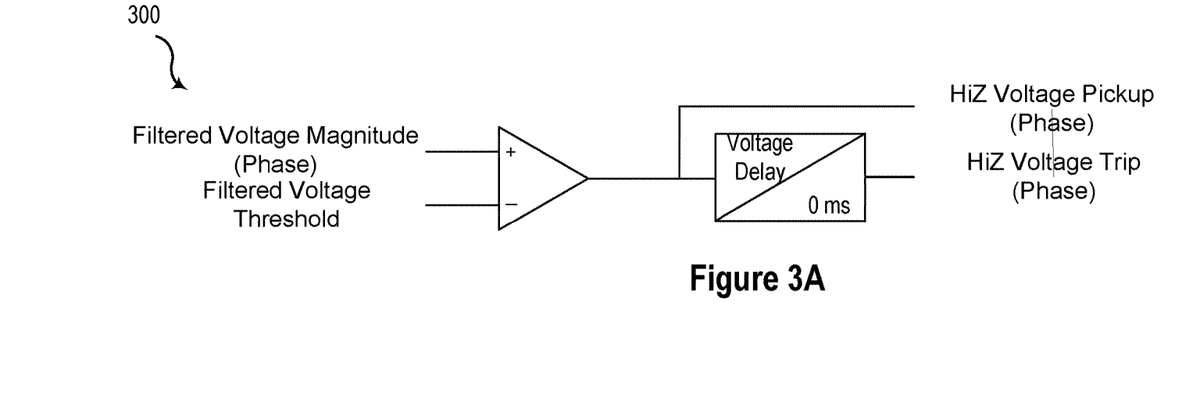
FIG. 3A illustrates a simplified logic diagram using filtered voltage signals to determine a differential fault on a power system consistent with embodiments of the present disclosure.

FIG. 3A illustrates a simplified logic diagram 300 using filtered voltage signals to determine a differential fault on a power system consistent with embodiments of the present disclosure. Although only a single phase is illustrated, additional phases may be monitored by similar logic systems. A filtered voltage magnitude may be obtained using voltages from the voltage channels (VA, VB, VC). The filtered voltage magnitude may be compared with a voltage pickup threshold, such as $V_{87Z}$, and may determine when the voltage exceeds the threshold. If the voltage exceeds the threshold for a predetermined delay, then a high-impedance voltage trip signal may be generated.

Figure 3B:
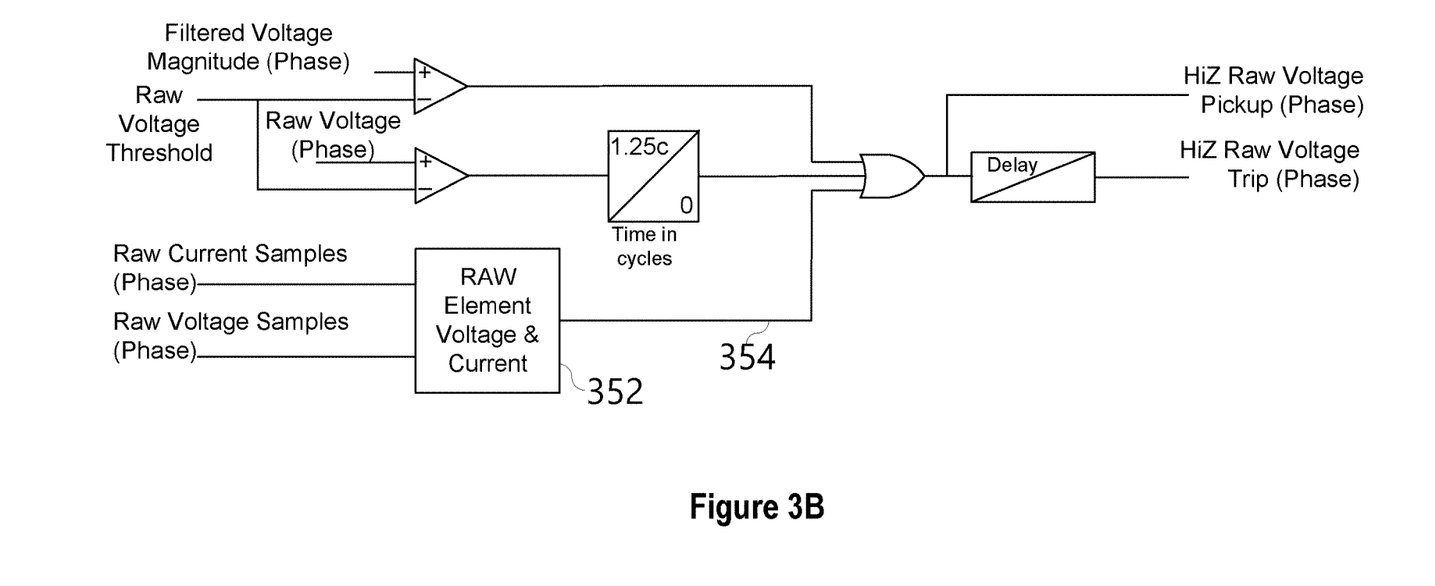
FIG. 3B illustrates a simplified logic diagram of a differential element that uses the filtered voltage as well as raw voltage signals and raw current signals for high-impedance differential protection consistent with embodiments of the present disclosure.

As discussed above, lower-class CTs may not provide sufficient signal under faulted conditions to detect a fault using a filtered voltage. Accordingly, FIG. 3B illustrates a simplified logic diagram of a differential element that uses the filtered voltage as well as raw voltage (VA, VB, VC) and raw current (IA, IB, IC) for high-impedance differential protection. A high-impedance differential fault is detected if: 1) the filtered voltage magnitude exceeds the voltage threshold for the delay time; OR 2) the raw voltage magnitude exceeds the raw voltage threshold for a predetermined pickup time and the delay time; OR 3) the raw voltage samples and current element samples 352 pick up 354 for the delay time. The raw voltage samples and current element samples 352 are described in more detail below.

Figure 3C:
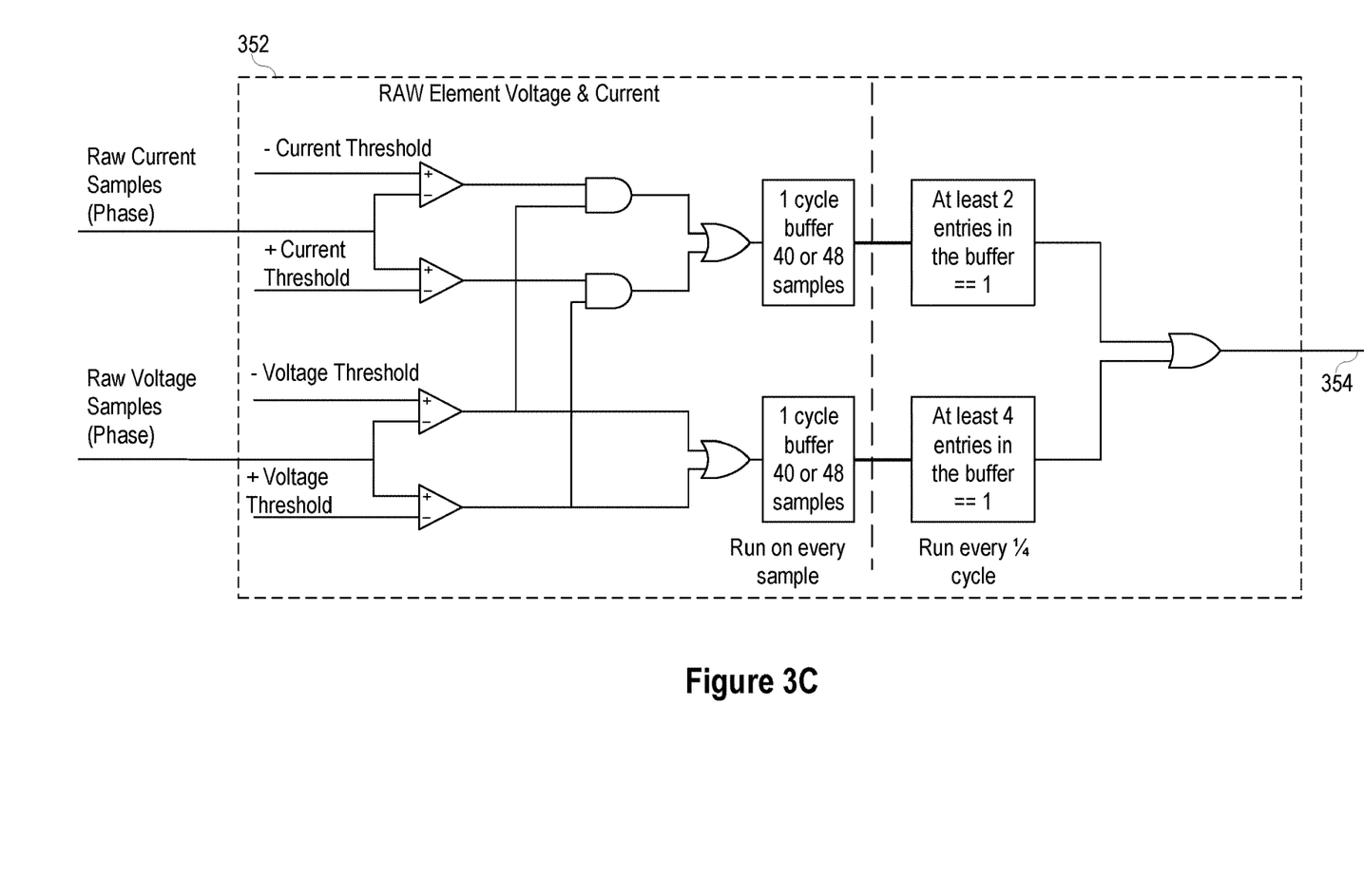
FIG. 3C illustrates a simplified logic diagram for outputting a high-impedance differential raw pickup signal using raw current samples and raw voltage samples consistent with embodiments of the present disclosure.

FIG. 3C illustrates a simplified logic diagram for outputting a high-impedance differential raw pickup signal 354 using raw current samples and raw voltage samples. Raw current samples (per phase) are compared against a negative-current threshold and a positive-current threshold. Raw voltage samples (per phase) are compared against a low-voltage threshold and a high-voltage threshold.

Figure 4A:
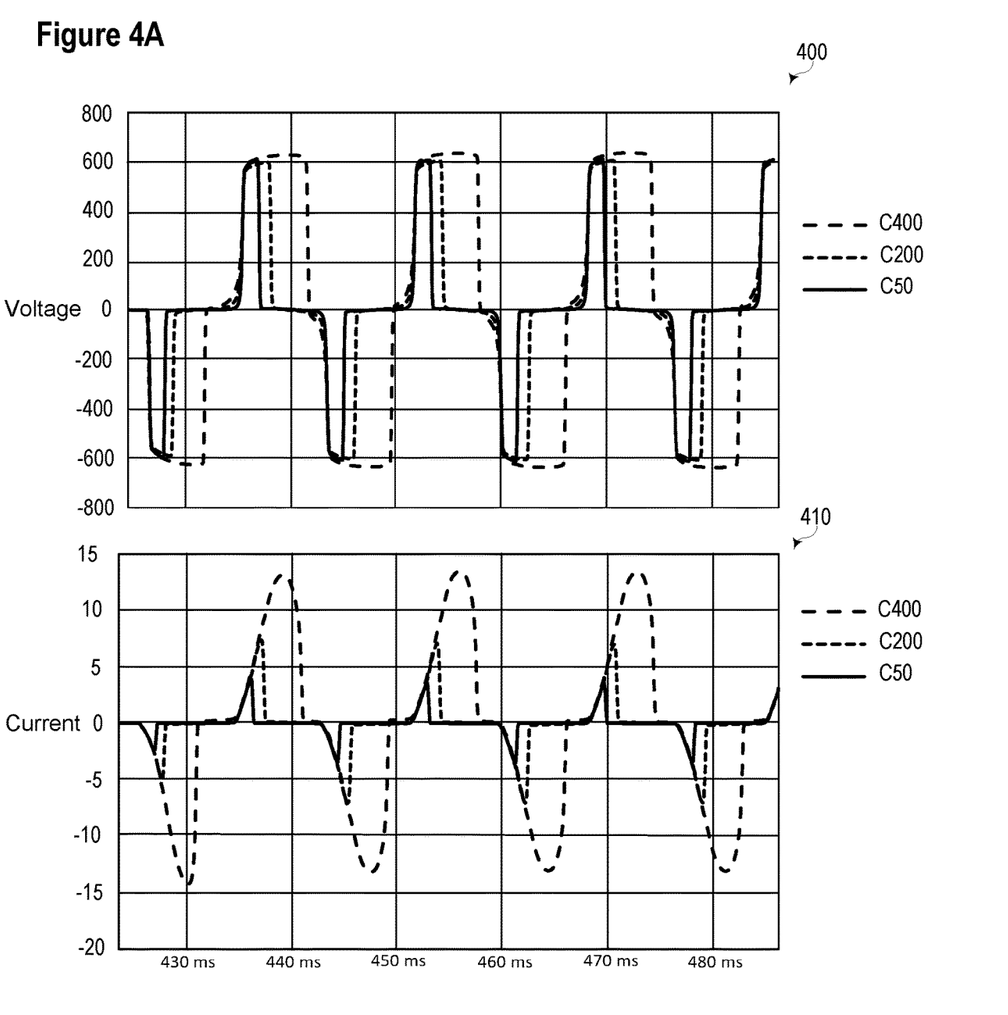
FIG. 4A illustrates plots over time of voltages and currents measured for three different classes consistent with embodiments of the present disclosure.

FIG. 4A illustrates plots over time of voltages and currents measured for three different classes consistent with embodiments of the present disclosure. As illustrated in plot 400, the voltage for the class 50 CTs (i.e., the lowest class shown) has the narrowest pulse width. In contrast, the class 400 CTs (i.e., the highest class shown) have the widest pulse width. The current values follow a similar pattern in plot 410 (i.e., in the lowest class the pulse is narrowest, and in the highest class the pulse width is the widest), additionally, the current peak is lower in the lower class.

If the raw current and the raw voltage both exceed their thresholds, then an OR gate signals a 1-cycle buffer. That is, if a raw current sample is lower than the negative-current threshold and a raw voltage sample is lower than the negative-voltage threshold then the OR gate signals the 1-cycle buffer. Similarly, if a raw current sample is higher than the positive-current threshold and the raw voltage sample is higher than the positive voltage threshold, then the OR gate signals the 1-cycle buffer. If there are at least two entries in this buffer then the raw element high-impedance differential pickup signal 354 is exerted.

In parallel, if the raw voltage sample exceeds (is lower than the negative-voltage threshold or is higher than the positive-voltage threshold), then a 1-cycle buffer is signaled. If there are four entries in this 1-cycle buffer, then the raw element high-impedance differential pickup signal 354 is exerted.

Accordingly, the high-impedance differential element may pick up using either filtered signals or raw phase current and raw phase voltage signals. Each of FIGS. 3A, 3B, and 3C are on a per-phase basis, but the logic may take place for each phase separately. That is, each of FIGS. 3A, 3B, and 3C may be repeated for each phase.

Figure 4B:
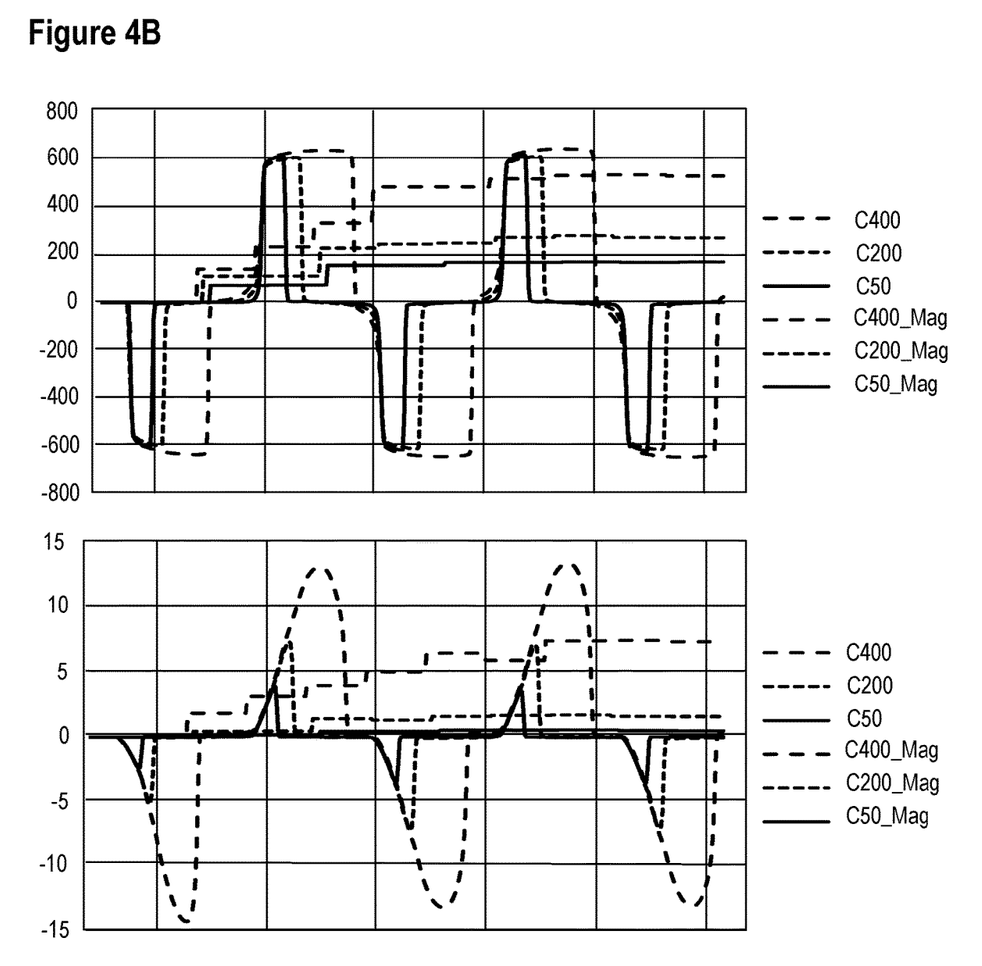
FIG. 4B illustrates plots over time of the voltages and currents illustrated in FIG. 4A, along with magnitudes for each signal consistent with embodiments of the present disclosure.

FIG. 4B illustrates plots over time of the voltages and currents illustrated in FIG. 4A, along with magnitudes for each signal consistent with embodiments of the present disclosure. The magnitude for both the voltage and current increases more quickly with higher final magnitudes for the higher class CTs (e.g., class 400), and more slowly with lower final magnitudes for the lower class CTs (e.g., class 50). Lower-class CTs have more attenuation in the magnitude of signals in comparison to higher-class CTs.

Signal processing for 87Z applications may utilize a full-cycle or half-cycle Fourier or cosine filtered fundamental phasor magnitudes. The filtered magnitude (voltage or current) is compared to a pickup setting ($V_{87Z}$) to determine if there is an internal fault. Filtered magnitudes provide high-fidelity representations of measured signals with low noise and leads to secure and dependable protection with adequately sized CTs; however, when low-class CTs are used, this approach will underestimate the magnitude of the signal, which desensitizes the protection.

In various embodiments consistent with the present disclosure, an estimate of the magnitude of the signal based on extreme or peak values within the latest cycle of data may be utilized. For example, a buffer may maintain a record of the latest full cycle of data and may compute a raw magnitude every quarter cycle using Eq. 3.

$$Mag_{raw} = \frac{|Buffer_{max} - Buffer_{min}|}{2\sqrt{2}} \qquad \text{Eq. 3}$$

The magnitude computed this way does not meet general metering or protection requirements but is sometimes adequate for certain 87Z applications. This raw magnitude may be compared with the pickup setting ($V_{87Z}$) to detect internal faults. This method produces more dependable results when low-class CTs are used in comparison to the use of filtered fundamental phasor magnitudes; however, noise in the input signal will show in the magnitude for a full cycle until the samples are cleared from the buffer. To avoid security issues when using this approach, a minimum pickup delay of more than a cycle must be implemented.

Figure 5A:
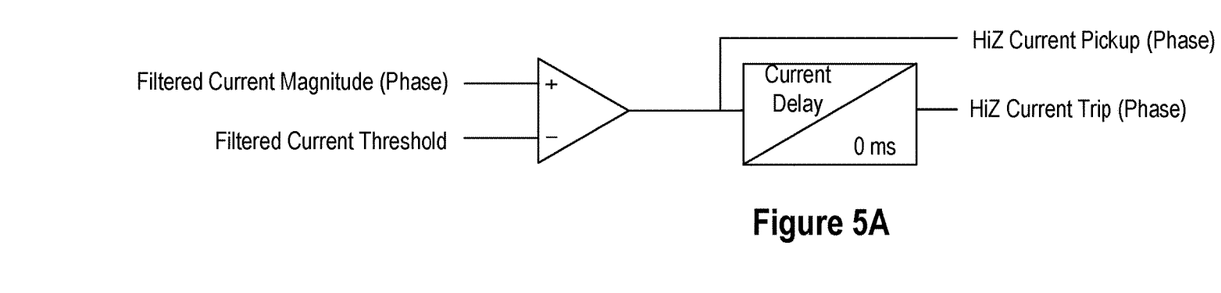
FIG. 5A illustrates a simplified logic diagram using filtered current signals to determine a differential fault on a power system consistent with embodiments of the present disclosure.

FIG. 5A illustrates a simplified logic diagram using filtered current signals to determine a differential fault on a power system consistent with embodiments of the present disclosure. In particular, a filtered current magnitude may be generated from currents from one or more phases. The filtered current magnitude may be compared with a current pickup threshold, and may output a high-impedance differential current pickup when the current exceeds the threshold. If the current exceeds the threshold for a predetermined delay, then a high-impedance current trip signal may be generated. As illustrated in FIGS. 4A and 4B, lower-class CTs provide lower signals in comparison to higher-class transformers under faulted conditions.

Figure 5B:
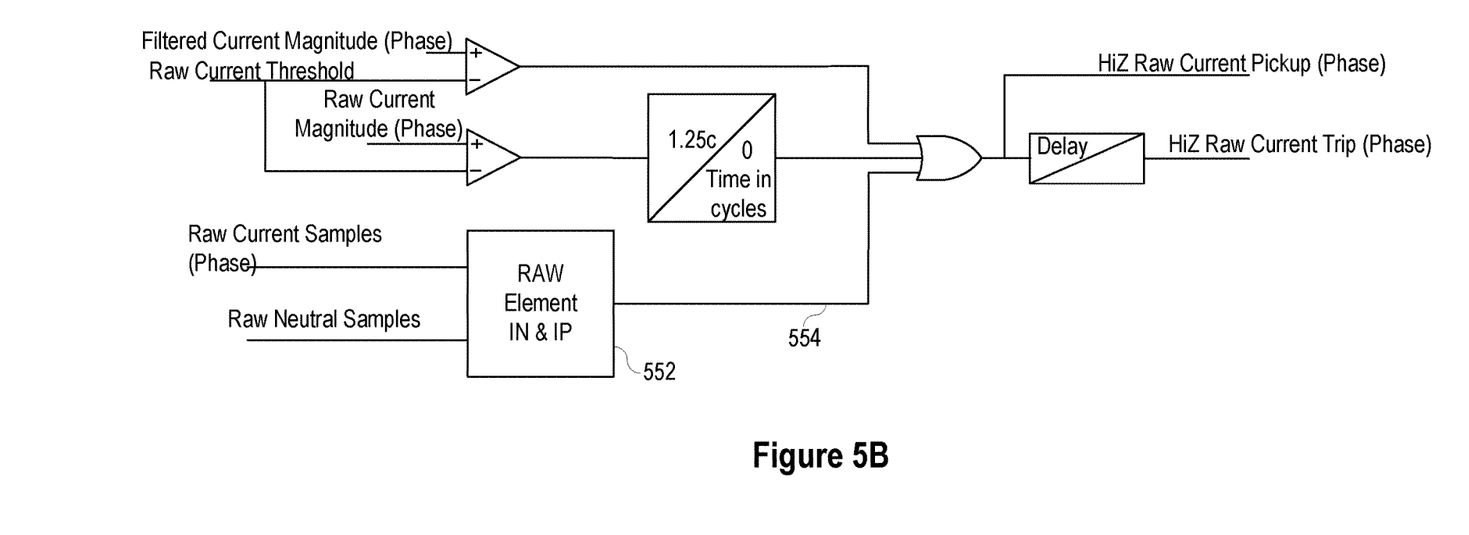
FIG. 5B illustrates a simplified logic diagram of a differential element that uses the filtered current as well as raw current signals and a raw neutral current (IN) signal for high-impedance differential protection consistent with embodiments of the present disclosure.

FIG. 5B illustrates a simplified logic diagram of a differential element that uses the filtered current as well as raw current and raw neutral current (IN) for high-impedance differential protection. A high-impedance differential fault is detected if: 1) the filtered current magnitude exceeds the current threshold for the delay time; OR 2) the raw current exceeds the raw current threshold for a predetermined pickup time and the delay time; OR 3) a raw current and neutral current element 552 picks up 554 for the delay time.

Figure 6:
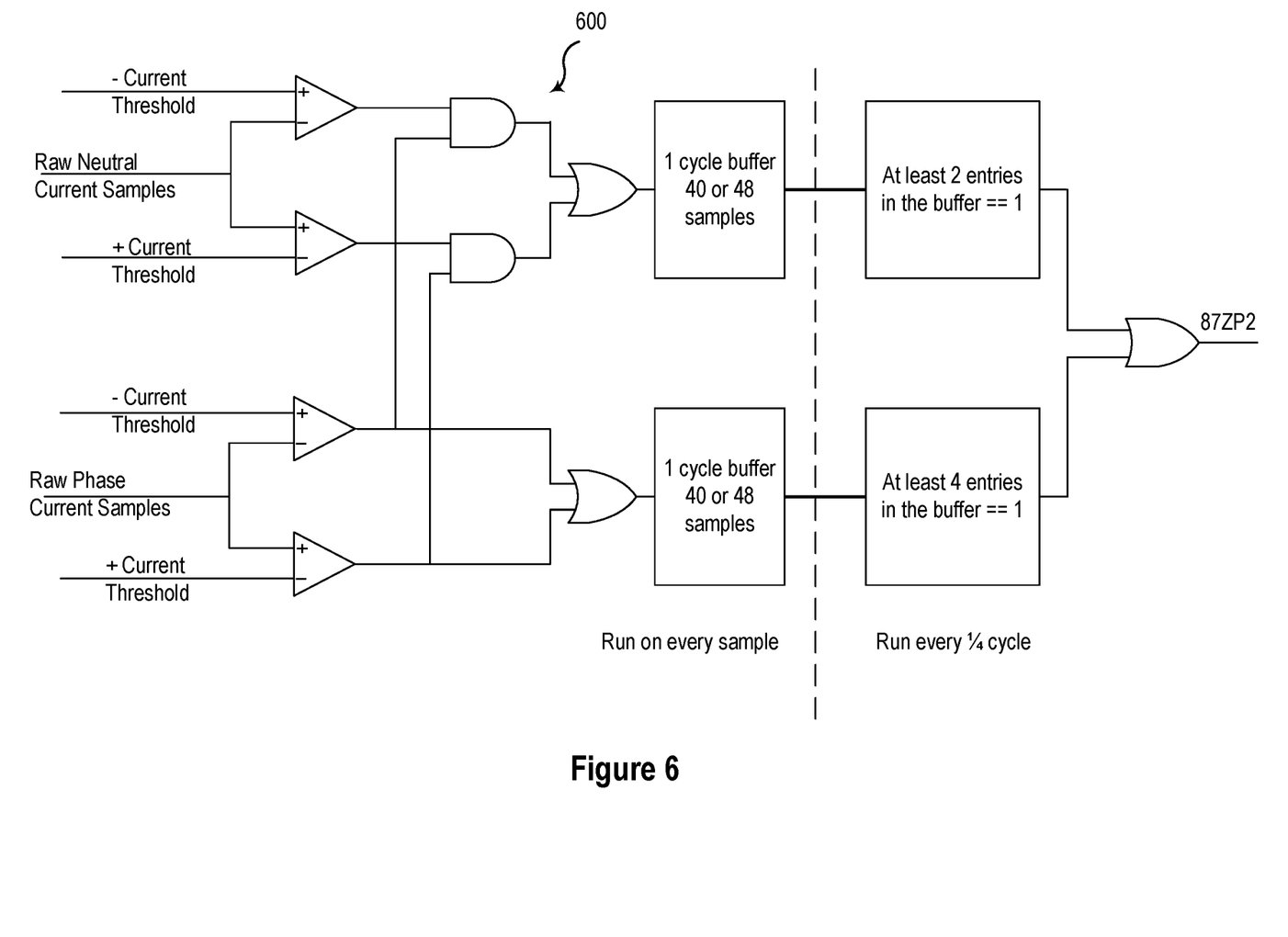
FIG. 6 illustrates a simplified logic diagram for outputting a high-impedance differential raw pickup signal using raw phase current samples and raw neutral current samples consistent with embodiments of the present disclosure.

FIG. 6 illustrates a simplified logic diagram of a raw current and neutral current element 600 for outputting a high-impedance differential signal (87ZP2) consistent with embodiments of the present disclosure. In some embodiments, element 552 of FIG. 5B may be embodied by raw current and neutral current element 600 Raw neutral current samples are compared against a low neutral current threshold and a high-neutral current threshold. Raw phase current samples (per phase) are compared against a negative-current threshold and a positive-current threshold.

If the raw neutral current and the raw phase current both exceed their thresholds, then an OR gate signals a 1-cycle buffer. That is, if a raw neutral current sample is lower than the negative-current threshold and a raw phase current sample is lower than the negative-current threshold then the OR gate signals the 1-cycle buffer. Similarly, if a raw neutral current sample is higher than the positive-current threshold and the raw phase current sample is higher than the positive-current threshold, then the OR gate signals the 1-cycle buffer. If there are at least two entries in this buffer then the raw element high-impedance differential pickup signal (87ZP2) is asserted.

In parallel, if the raw phase current sample exceeds (is lower than the negative-current threshold or is higher than the positive-current threshold), then a 1-cycle buffer is signaled. If there are four entries in this 1-cycle buffer, then the output signal 87ZP2 is asserted.

Combining raw samples from two different A/D channels (e.g., a voltage channel and a current channel or two current channels) fast and dependable 87Z logic may be achieved that is secure against SEUs. This approach may be particularly useful in low-class CT applications (e.g., C200 CTs or lower). Such systems may be able to use higher pickup thresholds without sacrificing dependability. Depending on the maximum differential fault current, lower-class CTs with this algorithm can be as dependable as using higher-class CTs. The security against external faults of the proposed logic remains the same as the pickup if it is above the maximum external voltage during an external fault.

Figure 7:
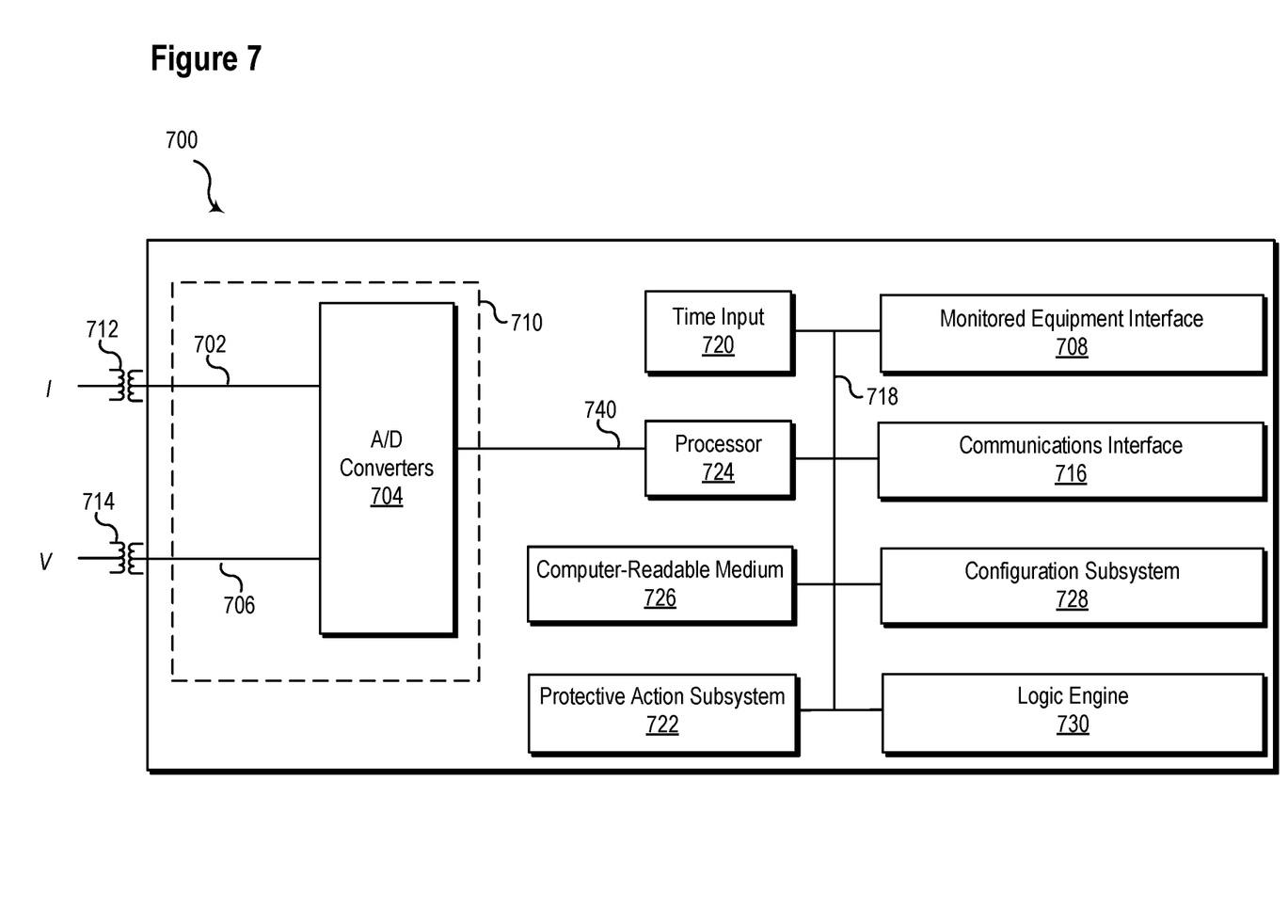
FIG. 7 illustrates a simplified block diagram of a protective device for use in an electric power system consistent with embodiments of the present disclosure.

FIG. 7 illustrates a simplified block diagram of a protective device 700 for use in an electric power system consistent with embodiments of the present disclosure. Protective device 700 may be implemented using hardware, software, firmware, and/or any combination thereof. In some embodiments, protective device 700 may be embodied as an IED, a protective relay, or other type of device. Certain components or functions described herein may be associated with other devices or performed by other devices. The specifically illustrated configuration is merely representative of one embodiment consistent with the present disclosure.

Protective device 700 includes a communications interface 716 to communicate with relays, IEDs, and/or other devices. In certain embodiments, the communications interface 716 may facilitate direct communication or communicate with systems over a communications network (not shown). Protective device 700 may further include a time input 720, which may be used to receive a time signal (e.g., a common time reference) allowing protective device 700 to apply a time stamp to acquired samples. In certain embodiments, a common time reference may be received via communications interface 716, and accordingly, a separate time input may not be required for time-stamping and/or synchronization operations. One such embodiment may employ the IEEE 1588 protocol. A monitored equipment interface 708 may receive status information from, and issue control instructions or protective actions to monitored equipment (e.g., a circuit breaker, conductor, transformer, or the like).

Processor 724 processes communications received via communications interface 716, time input 720, and/or monitored equipment interface 708. Processor 724 may operate using any number of processing rates and architectures. Processor 724 may perform various algorithms and calculations described herein. Processor 724 may be embodied as a general-purpose integrated circuit, an application-specific integrated circuit, a field-programmable gate array, and/or any other suitable programmable logic device. A data bus 718 may provide connection between various components of protective device 700. A configuration subsystem 728 may allow an operator to configure various aspects of protective device 700, including criteria related to thresholds or parameters described above.

Instructions to be executed by processor 724 may be stored in computer-readable medium 726. Computer-readable medium 726 may comprise random access memory (RAM) and non-transitory memory. Computer-readable medium 726 may be the repository of software modules configured to implement the functionality described herein.

Protective device 700 may include a sensor component 710. In the illustrated embodiment, sensor component 710 may receive current measurements 702 and/or voltage measurements 706. The sensor component 710 may comprise A/D converters 704 that sample and/or digitize filtered waveforms to form corresponding digitized current and voltage signals. Current measurements 702 and/or voltage measurements 706 may pass through transformers 712 and 714, respectively. Transformers 712 and 714 may generate raw signals representative of electrical conditions in an electric power system. In some embodiments, the signals may be a summation of three phases in an electric power system. Alternatively, additional inputs may be provided for each phase of a three-phase electric power system. A/D converters 704 may be connected to processor 724 by way of data bus 740, through which digitized representations of current and voltage signals may be transmitted.

Protective action subsystem 722 may implement a protective action based on detection of a fault condition or other anomalous condition. Protective actions may include actuating a breaker to interrupt the flow of electrical current through a portion of the electric power system. Protective actions may be implemented directly by protective device 700 or may be communicated to other devices to be implemented.

A logic engine may perform the comparisons and logical operations described herein. For example, logic engine 730 may compare current measurements 702 to a threshold to determine if the signal is outside the threshold. Similarly, logic engine 730 may compare voltage measurements 706 to a threshold to determine if the signal is outside the threshold. If a voltage or current signal is outside the threshold, protective device 700 may generate a count representing the number of samples when the signal is outside the threshold. When the count exceeds a specified number, a protective action may be triggered. The various thresholds may be established using configuration subsystem 728.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A protective device for use in an electric power system, the protective device comprising:
   a first input configured to receive a first signal from a transformer in electrical communication with a first portion of the electric power system, and to generate a first raw signal representative of a first electrical condition in the first portion of the electric power system;
   a second input configured to receive a second signal from a second transformer in electrical communication with a second portion of the electric power system, and to generate a second raw signal representative of a second electrical condition in the second portion of the electric power system; and a logic subsystem configured to:
compare the first raw signal to a first threshold;
compare the second raw signal to a second threshold;
generate a count representing samples when the first raw signal is outside the first threshold and when the second raw signal is outside the second threshold; and
generate a protective action signal based on the count.

2. The protective device of claim 1, wherein the protective device is configured to operate with transformers of a class rating of 50 or higher.

3. The protective device of claim 1, wherein the first signal represents a current and the second signal represents a voltage.

4. The protective device of claim 3, wherein the first signal comprises a summation of currents in a single phase in the electric power system.

5. The protective device of claim 1, wherein the first signal comprises a summation of currents from a plurality of current transformers in a single phase in the electric power system and the second signal comprises a current.

6. The protective device of claim 5, wherein the second signal comprises a summation of currents from a plurality of current transformers in all phases in the electric power system.

7. The protective device of claim 1, wherein the protective device provides differential protection to at least a portion of the electric power system.

8. The protective device of claim 1, further comprising a high-impedance module in electrical communication with the first input and the second input; and wherein the high-impedance module is disposed between the transformer and the and the first input and the second input.

9. The protective device of claim 1, wherein use of the first input and the second input improve security against a single event upset.

10. The protective device of claim 1, further comprising a first buffer to store approximately one cycle of samples representing the count of samples in which the first raw signal is outside the first threshold or the second raw signal is outside the second threshold.

11. The protective device of claim 10, further comprising a second buffer in communication with the first buffer, and configured to store a count of a number of samples in the first buffer that satisfy a criteria;
wherein the logic subsystem is further configured to assert the protective action signal when the count exceeds a first number.

12. The protective device of claim 11, further comprising a third buffer to store approximately one cycle of samples representing the count of samples in which the second raw signal is outside the second threshold.

13. The protective device of claim 12, further comprising a fourth buffer in communication with the third buffer, and configured to store a count of a number samples in the third buffer that satisfy a criteria;
wherein the logic subsystem is further configured to assert the protective action signal when the count exceeds a second number.

14. The protective device of claim 13, wherein the second number is greater than the first number.

15. The protective device of claim 14, wherein the fourth buffer is configured to update approximately each quarter cycle of the electric power system.

16. A method of using a protective device in an electric power system, the method comprising:
receiving, using a first input, a first signal from a transformer in electrical communication with a first portion of the electric power system, the first transformer generating a first raw signal representative of a first electrical condition in the first portion of the electric power system;
receiving, using a second input, a second signal from a second transformer in electrical communication with a second portion of the electric power system, the second transformer generating a second raw signal representative of a second electrical condition in the second portion of the electric power system;
comparing, using a logic subsystem,
the first raw signal to a first threshold, and
the second raw signal to a second threshold;
generating, using the logic subsystem, a count representing samples when the first raw signal is outside the first threshold and when the second raw signal is outside the second threshold; and
generating, using the logic subsystem, a protective action signal based on the count.

17. The method of claim 16, wherein the protective device is configured to operate with transformers of a class rating of 50 or higher.

18. The method of claim 16, wherein the first signal represents a phase current and the second signal represents a voltage.

19. The method of claim 16, wherein the first signal represents a current and the second signal represents a voltage.

20. The method of claim 16, further comprising providing a high-impedance module in electrical communication with the first input and the second input; and wherein the high-impedance module is disposed between the transformer and the first input and the second input.

* * * * *